(12) United States Patent
Shukla et al.

(10) Patent No.: US 9,699,325 B1
(45) Date of Patent: Jul. 4, 2017

(54) MOBILE PEER-TO-PEER DATA BALANCE TRANSFER

(71) Applicant: Verizon Patent and Licensing Inc., Arlington, VA (US)

(72) Inventors: Archana N. Shukla, Milton, GA (US); Mervin G. Johnson, Somerset, GA (US); Alexandra Fradkin, Somerset, NJ (US); Tarun Verma, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/982,339

(22) Filed: Dec. 29, 2015

(51) Int. Cl.
*H04M 15/00* (2006.01)
*H04M 1/725* (2006.01)

(52) U.S. Cl.
CPC ... *H04M 15/8214* (2013.01); *H04M 1/72569* (2013.01); *H04M 15/783* (2013.01); *H04M 15/844* (2013.01); *H04M 15/887* (2013.01)

(58) Field of Classification Search
CPC .... H04M 15/58; H04M 15/60; H04M 15/852; H04M 15/854; H04M 15/00; H04M 15/783; H04M 15/844; H04M 15/8214; H04M 15/887; H04M 1/72569; H04L 12/1435; H04L 67/325; H04L 41/0896; H04L 67/1097; H04L 45/50; H04L 47/125; H04L 67/2842; H04W 4/26; H04W 8/12; H04W 8/08; H04W 8/02; H04W 36/14; H04W 8/18; G06Q 20/3672; G06Q 20/3676; G06Q 20/40975; G06Q 20/32; G06Q 20/322; H04B 1/7176; G06F 3/067; G06F 9/5083; G07F 7/082; G07F 9/04
See application file for complete search history.

(56) References Cited

U.S. PATENT DOCUMENTS

| | | | |
|---|---|---|---|
| 2003/0045267 A1* | 3/2003 | Himmel | H04M 15/00 455/406 |
| 2009/0081989 A1* | 3/2009 | Wuhrer | G06Q 20/10 455/406 |
| 2010/0017506 A1* | 1/2010 | Fadell | H04M 15/00 709/224 |
| 2013/0196617 A1* | 8/2013 | Zalmanovitch | H04W 24/02 455/405 |

(Continued)

*Primary Examiner* — Nizar Sivji (57) ABSTRACT

A third-party data balance transfer system enables a user of a wireless service network to transfer a data balance to another user of the wireless service network. For example, a third-party data balance transfer system may provide an interface to receive a request from a donor to transfer a data balance to a recipient. A third-party data balance transfer system may verify that the donor is eligible to transfer a data balance, and that the recipient is eligible to receive data. The third-party data balance transfer system may forward a message to the recipient when the eligibility of the donor and recipient are verified. The message may include instructions that direct the recipient to perform certain actions to activate the transfer a data balance. The third-party data balance transfer system may detect when the recipient performs the actions, and the third-party data balance transfer system may update account records for the wireless service network to enable the recipient to access the data balance transfer.

20 Claims, 7 Drawing Sheets

(56) References Cited

U.S. PATENT DOCUMENTS

| | | | |
|---|---|---|---|
| 2014/0068212 A1* | 3/2014 | Lin | H04M 15/58 711/162 |
| 2015/0296362 A1* | 10/2015 | Chukka | G06Q 20/3227 455/408 |
| 2016/0055583 A1* | 2/2016 | Liberty | G06Q 40/04 705/37 |

* cited by examiner

MOBILE PEER-TO-PEER DATA BALANCE TRANSFER

BACKGROUND

A service provider may provide various voice and data services. For example, the service provider may enable a user to place voice calls, exchange e-mail or text messages, use various services, multimedia content, and/or access the Internet or other data networks. Due to bandwidth limitations in associated service networks, the service provider may enforce various types of data limits on the users. For example, the service provider may limit an amount of data that may be accessed by a user. After the user has reached a data limit, the service provider may prevent (e.g., cap) the user from accessing additional data, may charge the user to access additional data, and/or may slow down (e.g., throttle) the rate that data is provided to the user.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein generally relate to a third-party data balance transfer system for enabling a user of a wireless service network to transfer a data balance to another user of the wireless service network. For example, a third-party data balance transfer system may provide an interface to receive a request from a donor to transfer a data balance to a recipient. A third-party data balance transfer system may verify that the donor is eligible to transfer a data balance, and the recipient is eligible to receive data. The third-party data balance transfer system may forward a message to the recipient when the eligibility of the donor and recipient are verified. The message may include instructions that direct the recipient to perform certain actions to activate the transferred data balance. The third-party data balance transfer system may detect when the recipient performs the actions, and the third-party data balance transfer system may update account records for the wireless service network to enable the recipient to access the data balance transfer.

As used herein, the term "user" is intended to be broadly interpreted to include a user device or a person using the user device. Also, the terms "user," "consumer," "subscriber," and/or "customer" may be used interchangeably. The terms a "data balance transfer" or "data balance transfer" is intended to intended to be broadly interpreted to include access to a service network to exchange a transferred amount of data.

Figure 1:
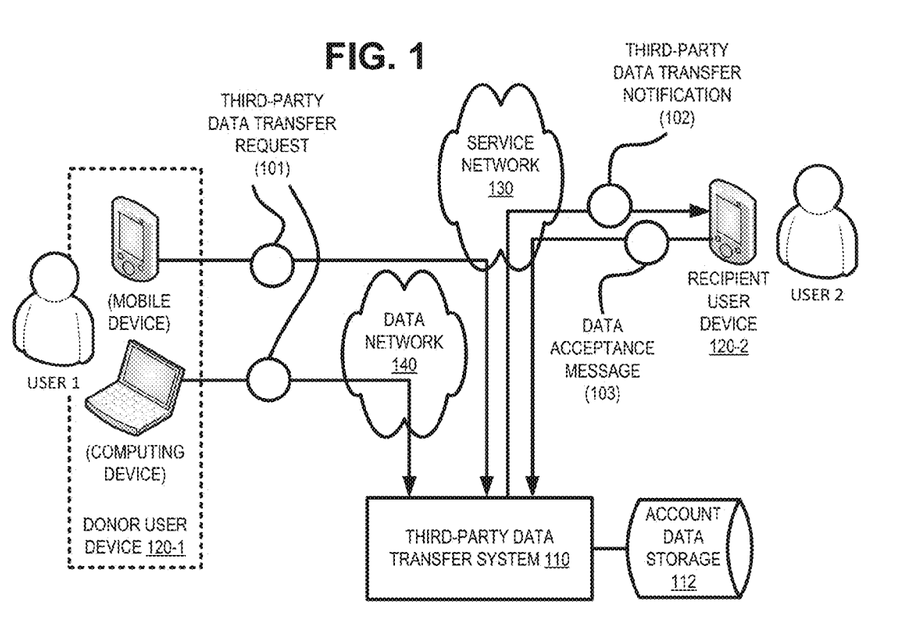
FIG. 1 illustrates an overview of an exemplary implementation for transferring a data balance from one user to another user.

FIG. 1 illustrates an overview of an exemplary implementation described herein for transferring a data balance from one user to another user. The example shown in FIG. 1 includes a third-party data balance transfer system 110, user devices 120 (shown in FIG. 1 as donor user devices 120-1 associated with User 1 (also referred to as a "donor") and recipient user devices 120-2 associated with User 2 (also referred to as a "recipient")), a service network 130, and a data network 140, As shown in FIG. 1, third-party data balance transfer system 110 may maintain and/or access an account data storage 112 that stores information above User 1, User 2, and/or other users of service network 130. For example, account data storage 112 may store biographic information (e.g., name, residence address, demographic data, etc.) for User 1 and User 2; account information (e.g., goods and services associated with User 1 and User 2); payment information for User 1 and User 2 (e.g., credit card and/or account numbers), and/or information regarding user devices 120 associated with User 1 and User 2. As described in greater detail below, account data storage 112 may be used by service network 130 when providing services to User 1 and User 2.

As further shown in FIG. 1, third-party data balance transfer system 110 may receive a third-party data balance transfer request 101 from User 1. For example, third-party data balance transfer system 110 may provide an interface (e.g., a web page for receiving third-party data balance transfer request 101 from donor user device 120-1). Third-party data balance transfer request 101 may include an indication that User 1 wishes to transfer an amount of data access, via service network 130, to User 2. Third-party data balance transfer request 101 may also include, for example, information identifying User 1 and User 2, such as a name, account number, address, telephone number, etc., associated with User 1 and User 2. Third-party data balance transfer request 101 may further include validation data, such as an account name and password pair, biographic data, login data, etc. that may be used by third-party data balance transfer system 110 to verify that third-party data balance transfer request 101 was sent by User 1. As described in greater detail below, third-party data balance transfer system 110 may correspond to an application server for verifying that User 1 is eligible to transfer a data balance to User 2 and further verify that User 2 is eligible to receive and use the transferred data balance.

Additionally, third-party data balance transfer request 101 may include data identifying one or more attributes of donor user devices 120-1 and/or recipient user device 120-2. For example, third-party data balance transfer request 101 may include a mobile device number (MDN), a mobile subscriber identification number (MSIN), an international mobile subscriber identity (IMSI), a temporary mobile subscriber identity (TMSI), a media access control address (MAC address), internet protocol (IP) address, or other data that may be presented by donor user device 120-1 when accessing service network 130. In other examples, third-party data balance transfer request 101 may include an international mobile station equipment identity (IMEI) for mobile devices, a mobile equipment identifier (MEID), a universally unique identifier (UUID) for non-mobile devices such as devices that communicate using short range communications protocols, such as Wi-Fi or Bluetooth®. Third-party data balance transfer system 110 may store at least a portion of third-party data balance transfer request 101 in account data storage 112. For example, account data storage 112 may store data identifying an MDN or other device identifier and password associated with an account.

As shown in FIG. 1, User 1 may forward third-party data balance transfer request 101 via service network 130, such as a wireless wide area network (WWAN). For example, User 1 may forward third-party data balance transfer request 101 using donor user device 120-1 that corresponds to a mobile device, such as a smart phone, that exchanges data over service network 130. Alternatively, as further shown in FIG. 1, User 1 may forward third-party data balance transfer request 101 via a separate data network 140, such as the Internet. For example, User 1 may forward third-party data balance transfer request 101 using a donor user device 120-1 that corresponds to a computing device or other device that exchanges data over data network 140. In some instances, third-party data balance transfer system 110 may provide a portal, such as a webpage, to receive inputs from User 1 related to third-party data balance transfer request 101. For example, third-party data balance transfer system 110 may collect login data or other information that may be used to verify that third-party data balance transfer request 101 is received from User 1.

Third-party data balance transfer system 110 may determine whether User 1 is eligible to transfer a data balance for accessing service network 130. For example, third-party data balance transfer system 110 may determine whether User 1 has a valid account for accessing service network 130. For instance, third-party data balance transfer system 110 may determine whether third-party data balance transfer request 101 is forwarded via service network 130 (e.g., donor user device 120-1 corresponds to a mobile device, such as a smart phone) or via data network 140 (e.g., donor user device 120-1 corresponds to a computing device). When third-party data balance transfer request 101 is forwarded via service network 130, third-party data balance transfer system 110 may identify an MDN or other account data associated with the donor based on metadata associated with transmitting third-party data balance transfer request 101. When third-party data balance transfer request 101 is forwarded via data network 140, third-party data balance transfer system 110 may parse third-party data balance transfer request 101 to determine the account data associated with the donor. Third-party data balance transfer system 110 may then access account data storage 112.

Third-party data balance transfer system 110 may then determine, based on the account data, whether User 1 is eligible to transfer a data balance to User 2. In one example, third-party data balance transfer system 110 may determine that User 1 is eligible to transfer a data balance requested in the third-party data balance transfer request 101 if User 1 has given less than (1) a threshold number of data balance transfers during a time period (e.g., five data transfers data during a month) or (2) a threshold quantity of data (e.g., 10 gigabytes) during the time period to User 2. Additionally or alternatively, third-party data balance transfer system 110 may determine whether User 1 has given more than a threshold number of data balance transfers during a time period and/or quantity of data to users of service network 130. Additionally or alternatively, third-party data balance transfer system 110 may verify that valid payment information for User 1 is stored in access account data storage 112 and/or is identified in third-party data balance transfer request.

Additionally or alternatively, third-party data balance transfer system 110 may determine whether User 1 is eligible to transfer a data balance to User 2 based on whether some type of relationship exists between User 1 and User 2. For example, third-party data balance transfer system 110 may infer that User 1 and User 2 have a relationship if they share a common business or residential address. In another example, third-party data balance transfer system 110 may identify a relationship between User 1 and User 2 if they share account data (e.g., User 1 and User 2 are subscribed to a joint plan). In another example, third-party data balance transfer system 110 may determine that a relationship exists between User 1 and User 2 when User 1 is a contact of User 2 (or User 2 is a contact of User 1) such that an MDN, a name, and/or other contact information for User 1 is included in a contact list maintained by recipient user device 120-2. In yet another example, third-party data balance transfer system 110 may determine that a relationship exists between User 1 and User 2 when donor user device 120-1 and recipient user device 120-2 are connected to a common base station or wireless router or are communicating using a short-range wireless protocol such as Bluetooth® or Wifi.

Third-party data balance transfer system 110 may further determine whether User 2 is eligible to receive a data balance transfer for accessing service network 130. For example, third-party data balance transfer system 110 may determine whether User 2 has a valid account for access service network 130. For instance, third-party data balance transfer system 110 may access account data storage 112 using identifying data included in or otherwise obtained using third-party data balance transfer request 101 to determine stored account information associated with User 2. Third-party data balance transfer system 110 may then determine, based on the account data, whether User 2 is eligible to receive the transfer a data balance transfer. In one example, third-party data balance transfer system 110 may then determine that User 2 is ineligible to receive another data balance transfer if User 2 already received more than a threshold number of data balance transfers or a threshold quantity of data during the time period from User 1 and/or from other subscribers of service network 130.

In another implementation, service network 130 may support two or more types of data, such as a "fast" data type and a "slow" data type. For example, service network 130 may support data transmissions using different protocols and/or different transmission characteristics (e.g., frequency bands, signal strengths, transmission media, etc.) that cause the different data types to have different characteristics (e.g., bandwidth, transmission speed, priority, etc.). When processing third-party data balance transfer request 101 is associated with transferring access to a specific data type (e.g., fast data), third-party data balance transfer system 110 may determine whether User 2 is eligible to receive that data type. For example, third-party data balance transfer system 110 may determine whether User 2 is contractually allowed, based on data stored in account data storage 112, to use the data type specified in third-party data balance transfer request 101. Additionally or alternatively, third-party data balance transfer system 110 may reject data balance transfer request 101 (e.g., determine that User 2 is not eligible to receive the data balance transfer) if the data balance transfer is not useful to User 2. For example, third-party data balance transfer system 110 may reject data balance transfer request 101 when the stored account data indicates that User 2 is already (e.g., without receiving the data balance transfer) allowed to access more than a threshold amount of faster data.

Additionally or alternatively, third-party data balance transfer system 110 may determine that User 2 is eligible to receive the data balance transfer based on whether recipient user device 120-2 (or another device associated with User 2) is capable of using the data type indicated in third-party data balance transfer request 101. For example, third-party data balance transfer system 110 may determine whether recipient user device 120-2 is compatible with the data balance transfer type. In another example, third-party data balance transfer system 110 may determine whether recipient user device 120-2 is located at geographic position (e.g., within transmissions range of an associated base station) where the data balance transfer type is accessible by recipient user device 120-2. In this last example, third-party data balance transfer system 110 may determine that User 2 is eligible to receive the data balance transfer when recipient user device 120-2 is located in a cell that is compatible with the data balance transfer type.

When third-party data balance transfer system 110 determines that User 1 is eligible to transfer a data balance and that User 2 is eligible to receive the data balance transfer, third-party data balance transfer system 110 may update account data storage 112 to update data associated with User 2 to reflect the data balance transfer. Additionally, third-party data balance transfer system 110 may forward third-party data balance transfer notification 102 to recipient user device 120-2. Third-party data balance transfer notification 102 may include, for example, information identifying the data balance transfer type and the amount of data balance transfer. Third-party data balance transfer notification 102 may further include information identifying User 1, terms of use associated with the data balance transfer, etc. Third-party data balance transfer notification 102 may further include credentials or other data that may be used by User 2 to activate the data balance transfer.

In one implementation, third-party data balance transfer notification 102 may prompt User 2 to perform certain actions and/or submit a particular input to activate the data balance transfer. For example, third-party data balance transfer notification 102 may prompt User 2 to forward a data acceptance message 103. Data acceptance message 103 may include, for example, information identifying User 2 and/or recipient user device 120-2 and the credentials included in third-party data balance transfer notification 102. When data acceptance message 103 is received, third-party data balance transfer system 110 may update account data storage 112 to reflect the activation of the data balance transfer. In this way, User 2 may wait to activate the data balance transfer until a desired time. In certain implementations, third-party data balance transfer notification and/or data acceptance message may include a short messaging system (SMS) message such as a text message.

The number of devices and/or networks illustrated in the example shown in FIG. 1 is provided for explanatory purposes only. In practice, third-party data balance transfer for service network 130 may involve additional devices and/or networks, fewer devices and/or networks, different devices and/or networks, or differently arranged devices and/or networks than those illustrated in FIG. 1. Also, in some implementations, the third-party data balance transfer may include one or more of the devices and/or network, shown in FIG. 1, performing one or more functions described as being performed by another one or more of other devices and/or networks. The devices and/or networks of the example shown in FIG. 1 may be interconnected via wired connections, wireless connections, or a combination of wired and wireless connections.

Figure 2:
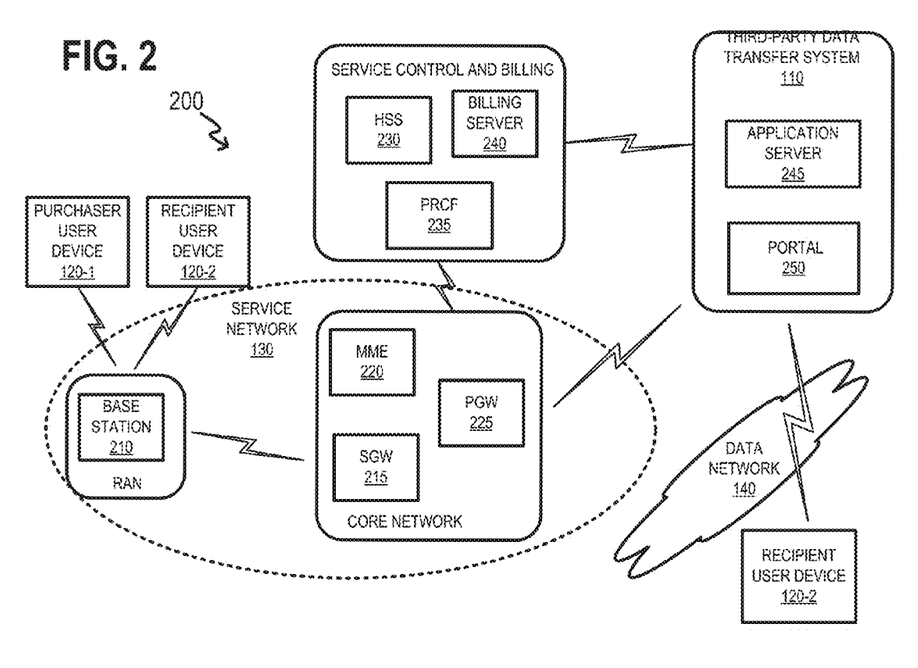
FIG. 2 shows exemplary environment in which systems and/or methods described herein may be implemented.

FIG. 2 illustrates an exemplary environment 200 in which systems and/or methods, described herein, may be implemented. As shown in FIG. 2, environment 200 may include third-party data balance transfer system 110, user devices 120 (shown in FIG. 2 as donor user device 120-1 and recipient user devices 120-2), service network 130, data network 140, a base station 210, a serving gateway (SGW) 215, a mobility management entity device (MME) 220, a packet data network (PDN) gateway (PGW) 225, a home subscriber server (HSS) 230, a policy and charging rule function (PCRF) 235, a billing server 240, an application server 245, and a portal 250.

Environment 200 may include a radio access network (RAN) that is associated with a long-term evolution (LTE) network and/or another type of wireless communications network, and a core network, such as an evolved packet core (EPC) that operates based on a third generation partnership project (3GPP) wireless communication standard. The RAN may include one or more base stations, also known as evolved base stations or evolved Node Bs (eNBs), through which user devices 120 (also known as user equipment or "UEs") communicate with the core network. The RAN may correspond to an evolved universal mobile telecommunications system (UMTS) terrestrial radio access network (E-UTRAN) for handling radio communications between user devices 120 and for sending signaling messages, such as handover commands, to user devices 120.

As shown in FIG. 2, the core network may include SGW 215, MME 220, and/or PGW 225. The core network may manage communications between user devices 120 and third-party data balance transfer system 110 (e.g., application server 245 and/or portal 250). In environment 200, a service control and billing portion, which controls operation of the core network, may include HSS 230, PCRF 235, and/or billing server 240. The service control and billing portion may process telephone calls on behalf of user devices 120. The service control and billing portion may further manage authentication, connection initiation, account information, user profile information, etc. associated with access by user devices 120 to the core network. For example, the service control and billing portion may initiate a session between donor user device 120-1 and third-party data balance transfer system 110 to forward third-party data balance transfer request 101.

User device 120 may include a communication device, such as a wireless mobile device that is capable of communicating with base station 210 and/or a network (e.g., service network 130 and/or data network 140). For example, user device 120 may include a cellular telephone, a personal communications system (PCS) terminal (e.g., a device that combines a cellular radiotelephone with data processing and data communications capabilities), a personal digital assistant (PDA), a smart phone, a laptop computer, a tablet computer, a camera, a personal gaming system, or another type of computation or communication device. In other implementations, user device 120 may include a set-top box (STB), a tablet, a gaming machine, a computer, a fitness tracker, a smart watch, smart glasses, or another peripheral and/or wearable device that may be used in connection with another user device 120.

Base station 210 may include one or more network devices that receive, process, and/or transmit traffic, such as audio, video, text, and/or other data, destined for and/or received from user device 120. In an example implementation, base station 210 may be an eNB device and may be part of the LTE network. Base station 210 may receive traffic from and/or send traffic to data network 140 via SGW 215 and PGW 225. Base station 210 may send traffic to and/or receive traffic from user device 120 via the RAN.

SGW 215 may include one or more network devices, such as a gateway, a router, a modem, a switch, a firewall, a network interface card (NIC), a hub, a bridge, a proxy server, an optical add-drop multiplexer (OADM), or another type of device that processes and/or transfers traffic. SGW 215 may, for example, aggregate traffic received from one or more base stations 210 and may send the aggregated traffic to data network 140 via PGW 225. In one example implementation, SGW 215 may route and forward user data packets, may act as a mobility anchor for a user plane during inter-eNB handovers, and may act as an anchor for mobility between LTE and other 3GPP technologies.

MME 220 may include one or more network devices that perform operations associated with a handoff to and/or from service network 130. MME 220 may perform operations to register user device 120 with service network 130, to handoff user device 120 from service network 130 to another network, to handoff user device 120 from the other network to service network 130, and/or to perform other operations. MME 220 may perform policing operations for traffic destined for and/or received from user device 120. MME 220 may authenticate user device 120 (e.g., via interaction with HSS 230) to establish the session between user device 120 and third-party data balance transfer system 110.

PGW 225 may include one or more network devices, such as a gateway, a router, a modem, a switch, a firewall, a NIC, a hub, a bridge, a proxy server, an optical add/drop multiplexor (OADM), or another type of device that processes and/or transfers traffic. PGW 225 may, for example, provide connectivity of user device 120 to data network 140 by serving as a traffic exit/entry point for user device 120. PGW 225 may perform policy enforcement, packet filtering, charging support, lawful intercept, and/or packet screening. PGW 225 may also act as an anchor for mobility between 3GPP and non-3GPP technologies.

HSS 230 may include one or more server devices that function as a central database for storing information about subscribers of service network 130. For example, HSS 230 may manage, update, and/or store, in a memory associated with HSS 230, profile information associated with the subscribers, including data information identifying previous data balance transfers requested by the subscribers and data balance transfers received by the subscribers.

Furthermore, HSS 230 may update a profile of a data balance transfer recipient (e.g., User 2) to reflect a data balance transfer to the recipient (e.g., when third-party data balance transfer notification 102 is sent to User 2). For example, HSS 230 may store data identifying an amount of data balance transferred to the recipient. HSS 230 may update a profile of a data balance transfer recipient (e.g., User 2) to reflect when the data balance transfer is activated by the recipient (e.g., when data acceptance message 103 is sent by User 2), and terms for accessing the data balance transfer (e.g., an expiration date).

Additionally or alternatively, HSS 230 may perform authentication, authorization, and/or accounting operations associated with a communication connection with user device 120. In some implementations, HSS 230 may maintain billing information and may assess charges and credits to an account associated with user device 120 based on network usage information received from the core network and/or from the cloud services. Additionally, or alternatively, HSS 230 may store information regarding temporary credentials that are assigned to user device 120 (e.g., such as credentials as used by donor user device 120-1 to transmit third-party data balance transfer request 101 to third-party data balance transfer system 110).

PCRF 235 may include one or more devices that provide policy control decisions and flow based charging control functionalities. PCRF 235 may provide network control regarding service data flow detection, gating, quality of service (QoS) and flow based charging, etc. PCRF 235 may determine how a certain service data flow shall be treated, and may ensure that user plane traffic mapping and treatment are in accordance with a user's subscription profile. For example, PCRF 235 may access and update a user profile, maintained by HSS 230, for recipient user device 120-2 to reflect allocation and/or use of the data balance transfer.

Billing server 240 may store data identifying changes in services (e.g., based on receiving instructions from third-party data balance transfer system 110) and may modify user and device profiles, as applied by HSS 230 and/or PRCF based on the service changes. Billing server 240 may further determine and collect fees associated the requested service changes. Billing server 240 may further charge a service fee to donor user device 120-1 for the data balance transfer. Additionally, billing server 240 may be programmed to not charge recipient user device 120-2 for accessing the transferred data balance.

As described above with respect to FIG. 1, application server 245 may receive and process third-party data balance transfer request 101. For example, application server 245 may verify that a donor (i.e., User 1) is eligible to transfer a data balance and a recipient (i.e., User 2) is eligible to receive the data balance transfer. As further described above with respect to FIG. 1, application server 245 may forward, as third-party data balance transfer notification 102, an SMS message to recipient user device 120-2 providing instructions for accessing the transferred data balance. Furthermore, application server 245 may receive data acceptance message 103, from recipient user device 120-2, requesting the transferred data balance, and application server 245 may update the service control and billing portion (e.g., HSS 230) to reflect activation of the transferred data balance.

Portal 250 may include a device for receiving third-party data balance transfer request 101 from user device 120-1 through data network 140. For example, portal 250 may correspond to a website for receiving third-party data balance transfer request 101. Portal 250 may forward information regarding third-party data balance transfer request 101 to application server 245.

Data network 140 may include one or more wired and/or wireless networks. For example, data network 140 may include the Internet, a public land mobile network (PLMN), and/or another network. Additionally, or alternatively, data network 140 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The number of devices and/or networks, illustrated in FIG. 2, is provided for explanatory purposes only. In practice, environment 200 may include additional devices and/or networks, fewer devices and/or networks, different devices and/or networks, or differently arranged devices and/or networks than those illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
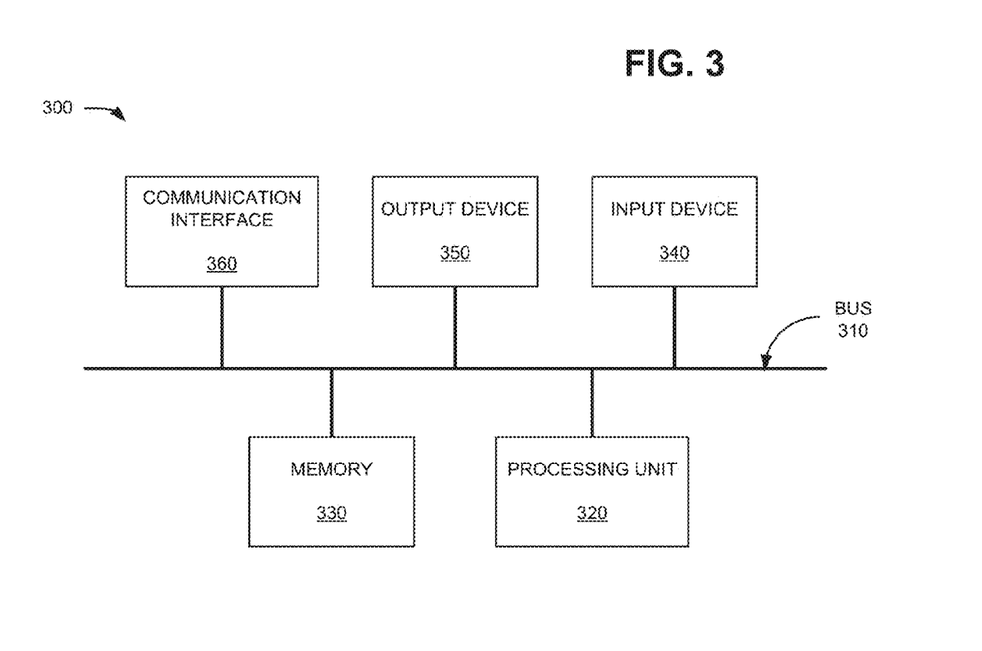
FIG. 3 shows a diagram of exemplary components that may be included in a computing device included in the environment shown in FIG. 2.

FIG. 3 is a diagram illustrating exemplary components of a computing device 300. User device 120, base station 210, SGW 215, MME 220, PGW 225, HSS 230, PCRF 235, billing server 240, application server 245, and/or portal 250 may include one or more devices 300 and/or one or more components of computing device 300. As shown in FIG. 3, computing device 300 may include a bus 310, a processor 320, a memory 330, an input component 340, an output component 350, and a communication interface 360.

Bus 310 may include a path that permits communication among the components of computing device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to computing device 300, such as a keyboard, a keypad, a button, a switch, etc. Output component 350 may include a mechanism that outputs information to the user, such as a display, a speaker, one or more light emitting diodes (LEDs), etc. Communication interface 360 may include a transceiver mechanism that enables computing device 300 to communicate with other devices and/or systems via wireless communications, wired communications, or a combination of wireless and wired communications. For example, communication interface 360 may include mechanisms for communicating with another device or system via a network. Alternatively or additionally, communication interface 360 may be a logical component that includes input and output ports, input and output systems, and/or other input and output components that facilitate the transmission of data to other devices. In one implementation, user device 120 may include an antenna to exchange radio signals with base station 210.

Computing device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 3 shows exemplary components of computing device 300. In other implementations, computing device 300 may contain fewer components, additional components, different components, or differently arranged components than those depicted in FIG. 3. For example, computing device 300 may include one or more switch fabrics instead of, or in addition to, bus 310. In another example, in some implementations, a display may not be included in computing device 300, and in these situations, computing device 300 may be a "headless" device that does not include input component 340. Additionally or alternatively, one or more operations described as being performed by a particular component of computing device 300 may be performed by one or more other components, in addition to or instead of the particular component of computing device 300.

Figure 4:
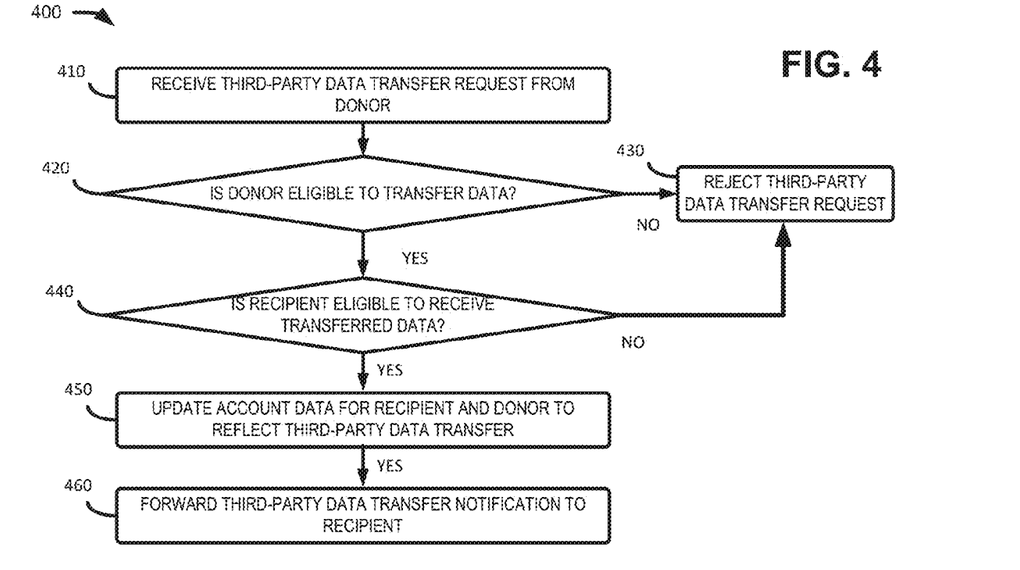
FIG. 4 is a flow diagram illustrating an exemplary process for transferring a data balance in the environment shown in FIG. 2.

FIG. 4 is a flow diagram illustrating an exemplary process 400 for transferring a data balance to recipient device 120-2. In one implementation, process 400 may be performed by third-party data balance transfer system 110 (e.g., application server 245 and/or portal 250). In other implementations, process 400 may be performed by one or more other devices of environment 200, such as user device 120, HSS 230, PCRF 235, and/or Billing server 240.

As shown in FIG. 4, process 400 may include receiving third-party data balance transfer request 101 (block 410) and determining whether the donor is eligible to transfer a data balance (block 420). Donor user device 120-1 may forward third-party data balance transfer request 101. For example, portal 250 may provide an input mechanism (e.g., a graphical user interface (GUI)) that enables the donor to forward third-party data balance transfer request 101. As described above with respect to FIG. 1, third-party data balance transfer system 110 may parse third-party data balance transfer request 101 to obtain information regarding donor user device 120-1 and/or the donor. For example, third-party data balance transfer request 101 may include information identifying an MDN for donor user device 120-1, a name of the user, an account identifier, an account password, etc. Third-party data balance transfer system 110 may use the contents of third-party data balance transfer request 101 to access account data associated with the donor and may use the account data to determine whether the donor is eligible to transfer a data balance. For example, third-party data balance transfer system 110 may determine whether the donor has donated more than a threshold amount of data and/or a threshold number of data balance transfers during a time period.

In one implementation, third-party data balance transfer request 101 may relate to transferring an amount of data access from donor user device 120-1 to recipient user device 120-2. In this situation, third-party data balance transfer system 110 may determine that the donor is eligible to transfer a data balance in block 420 when the transferred data is available (e.g., unused by recipient user device 120-2) and is eligible, based on the donor's service agreement, to be transferred to recipient user device 120-2.

If the donor is eligible to transfer a data balance (block 420—YES), third-party data balance transfer system 110 may determine whether the recipient is eligible to receive a data balance transfer (block 440). For example, third-party data balance transfer system 110 may use contents of third-party data balance transfer request 101 (e.g., the MDN of recipient user device 120-2) to access account data associated with the recipient. Third-party data balance transfer system 110 may use the recipient's account data to determine whether the recipient is eligible to receive a data balance transfer. For example, third-party data balance transfer system 110 may determine whether the recipient user device 120-2 (or another user device 120 associated with the recipient) has received more than a threshold number and/or amount of data balance transfers during a time period. Additionally or alternatively, third-party data balance transfer system 110 may determine whether the recipient user device 120-2 is compatible with a data balance transfer type identified in the third-party data balance transfer request 101.

If the donor is not eligible to transfer a data balance (block 420—NO) or the recipient is not eligible to receive the data balance transfer (block 440—NO) or, third-party data balance transfer system 110 may reject the third-party data balance transfer request (block 430). For example, third-party data balance transfer system 110 may forward a message to donor user device 120-1 indicating that third-party data balance transfer request 101 cannot be fulfilled.

As shown in FIG. 4, if the recipient is eligible to receive the data balance transfer (block 440—YES), third-party data balance transfer system 110 may update account data for the donor and the recipient to reflect the data balance transfer (block 450). For example, third-party data balance transfer system 110 may update billing server 240 to bill the donor for the data balance transfer. Additionally, third-party data balance transfer system 110 may update an account profile for recipient user device 120-2 (e.g., maintained by HSS 230) to reflect the data balance transfer.

As shown in FIG. 4, process 400 may further include forwarding third-party data balance transfer notification 102 to recipient user device 120-2 (block 460). As described above with respect to the example in FIG. 1, third-party data balance transfer notification 102 may include data identifying the donor and instructions for the recipient to access the data balance transfer. For example, third-party data balance transfer notification 102 may correspond to an SMS message (e.g., a text) that prompts the recipient to forward a response to activate the data balance transfer.

In one implementation, the donor may specify (e.g., in third-party data balance transfer request 101) one or more conditions for the recipient to activate the data balance transfer. For example, the donor may ask the recipient to perform certain tasks (e.g., view a multimedia content, fill out a survey, install an application, etc.). Third-party data balance transfer notification 102 forward in block 460 may include data identifying the actions to be performed by the recipient in order to access the data balance transfer.

Figure 5:
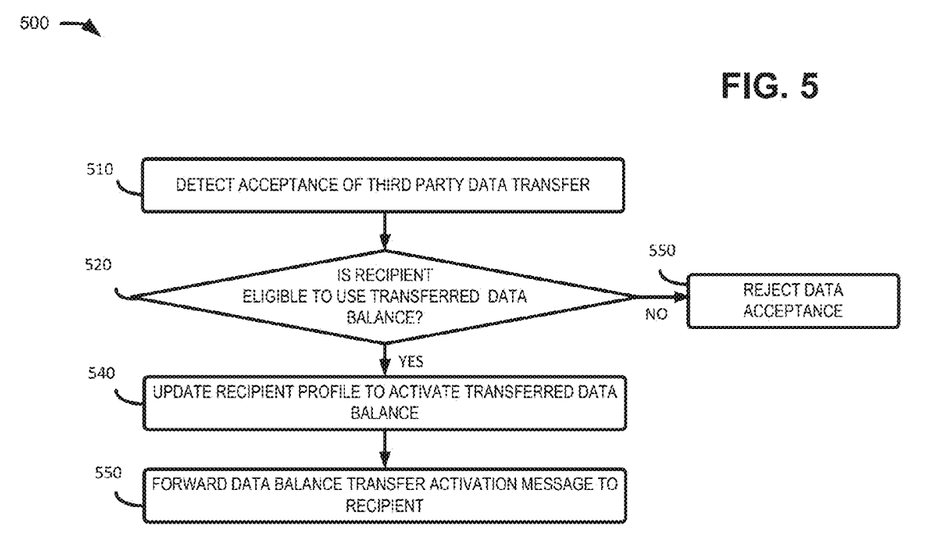
FIG. 5 is a flow diagram illustrating an exemplary process for using accessing data balance transfer in the environment shown in FIG. 2.

FIG. 5 is a flow diagram illustrating an exemplary process 500 for activating a transferred data balance in environment 200. In one implementation, process 500 may be performed by third-party data balance transfer system 110. In another implementation, process 500 may be performed by one or more other devices of environment 200, such as recipient user device 120-2, PGW 225, HSS 230, or PCRF 235.

As shown in FIG. 5, process 500 may include detecting an acceptance of the data balance transfer by the recipient (block 510). For example, third-party data balance transfer notification 102 may prompt the data recipient to provide some type of input and/or perform another action to access the data balance transfer. Third-party data balance transfer system 110 may receive an indication from recipient user device 120-2 when the input is provided and/or the action is performed. For example, third-party data balance transfer system 110 may receive, as data acceptance message 103, a response SMS from recipient user device 120-2. The response SMS may include specific data, such as a code to activate the transferred memory. Third-party data balance transfer system 110 verify, based on metadata (e.g., a source MDN or other address) associated with the response that the response SMS is received from recipient user device 120-2 or another device associated with the recipient.

As shown in FIG. 5, process 500 may include determining whether recipient user device 120-2 is eligible to use the transferred data balance (block 520). For example, third-party data balance transfer system 110 may determine that recipient user device 120-2 is ineligible to use the data balance transfer when recipient user device 120-2 has been reported as lost or stolen by the intended recipient. In another example, third-party data balance transfer system 110 may determine that recipient user device 120-2 is ineligible to use the data balance transfer if recipient user device 120-2 has activated more than a threshold number of data balance transfers (e.g., 5 data balance transfers during a month) or more than a threshold amount of transferred data balance (e.g., more than 10 GB of transferred data balance during a two-month period). In yet another example, third-party data balance transfer system 110 may determine that recipient user device 120-2 is ineligible to use the data balance transfer if recipient user device 120-2 is geographically located in another country and/or outside of cells provided by base stations 210 associated with service network 130.

In certain implementations, the donor may specify one or more tasks to be performed by the recipient before accessing the data balance transfer. For example, the recipient may be asked to view multimedia content such as an advertisement, fill out a survey, install an application, etc. In block 520, third-party data balance transfer system 110 may determine whether the donor is eligible to access the transferred data balance at least partially based on determining whether the recipient has performed the requested tasks. For example, recipient user device 120-2 may report when the requested tasks are performed, and third-party data balance transfer system 110 may update account data storage 112 based on the reports received from recipient user device 120-2.

If recipient user device 120-2 is not eligible to use the transferred data balance (block 520-NO), third-party data balance transfer system 110 may reject the data acceptance by the recipient (block 530). For example, third-party data balance transfer system 110 may forward a message to recipient user device 120-2, and the message may indicate that the data balance transfer is not available to recipient user device 120-2 during a time period (e.g., during the current week) and/or until certain tasks associated with the data balance transfer are performed.

If recipient user device 120-2 is eligible to use the transferred data balance (block 520—YES), third-party data balance transfer system 110 may update the recipient's profile to activate the transferred data balance (block 540). For example, data balance transfer system 110 may update profile data in service network 130 (e.g., in HSS 230) to enable recipient user device 120-2 to access the data balance transfer (e.g., to authorize recipient user device 120-2 exchange the transferred amount of data through service network 130). In one example, data balance transfer system 110 may update profile data in service network 130 so that the data balance transfer is used before other data available to recipient user device 120. For example, HSS 230 may maintain a queue of data available to recipient user device 120-2, and data balance transfer system 110 may rank the data balance transfer first in the queue.

In one implementation, data balance transfer system 110 may maintain data regarding unused data balance transfers (e.g., when third-party data balance transfer notification 102 is sent). This information may include, for example, information identifying an amount of data balance transferred to recipient user device 120-2 and/or other devices associated with the same user, donors associated with the data recipient user device 120-2, when the data balance transfer is activated, when unused data balance transfers expire (e.g., 1 year after third-party data balance transfer notification 102 is sent). When recipient user device 120-2 is eligible to use the transferred data balance (block 520—YES), block 540 may further include data balance transfer system 110 updating the data regarding pending data balance transfers to reflect the activation of the data balance transfer.

As shown in FIG. 5, process 500 may also include forwarding a data balance transfer activation message to recipient user device 120-2 or another device associated with the recipient (block 550) after updating the recipient profile to activate the transferred data balance. For example, the data balance transfer activation message may indicate to recipient user device 120-2 that the transferred data balance is available to be accessed. Additionally or alternatively, the data balance transfer activation message may include instructions for using recipient user device 120-2 to access the transferred data balance. For example, the data balance transfer activation message may direct the recipient to change a setting on recipient user device 120 and/or activate an application on recipient user device 120 to access the data balance. For instance, the data balance transfer activation message may direct the recipient to activate a wireless component (e.g., a WWAN antenna) for communicating with base stations 210.

Figure 6:
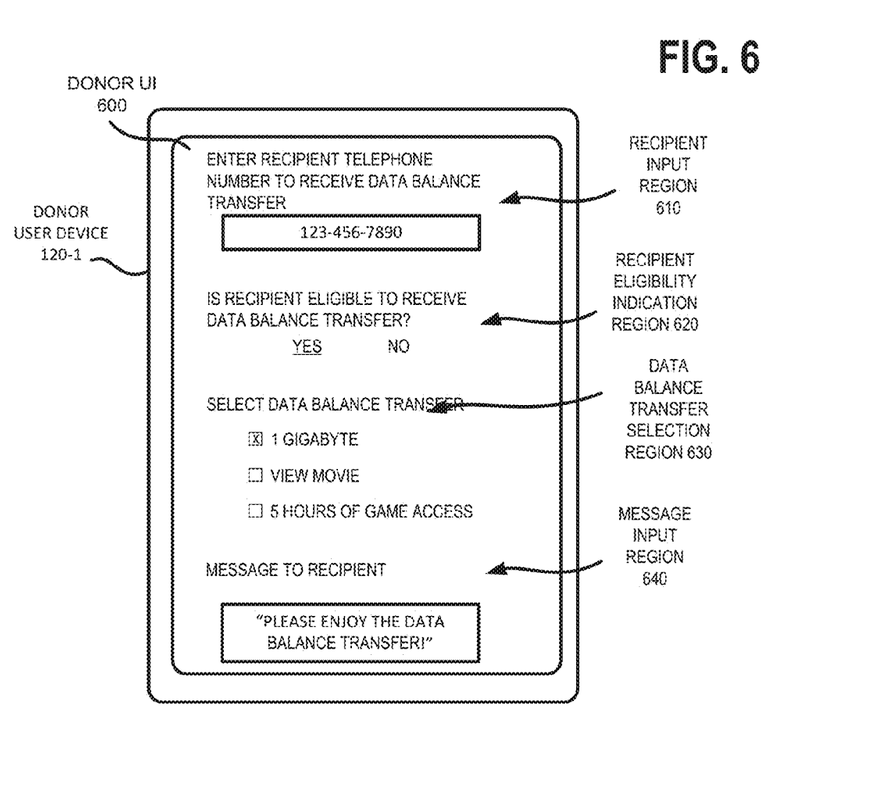
FIG. 6 shows an exemplary donor user interface that may be presented by a donor device in the environment shown in FIG. 2.

FIG. 6 shows an exemplary donor user interface (UI) 600 that may be presented by donor user device 120-1 in connection with receiving user inputs related to forming third-party data balance transfer request 101. In the example shown in FIG. 6, donor UI 600 may include a recipient input region 610, a recipient eligibility indication region 620, a data balance transfer selection region 630, and a message input region 640. As shown in FIG. 6, donor UI 600 may correspond, for example, to a form presented through an application or website for exchanging data between donor user device 120-1 and third-party data balance transfer system 110.

Recipient input region 610 may prompt the donor to input an identifier associated with an intended recipient and/or recipient user device 120-2. For example, as shown in FIG. 6, recipient input region 610 may prompt the donor to input a telephone number (i.e., an MDN) of recipient user device 120-2. In other example, recipient input region 610 may prompt the donor to input a name, an address, an account number, or other data associated with the intended recipient.

In one implementation, recipient input region 610 may allow the donor to designate a group of recipients. For example, recipient input region 610 may allow the donor to input MDNS for two or more recipient devices 120-2. In another example, recipient input region 610 may allow the donor to input selection criteria to select intended recipients from a group of other users. For instance, recipient input region 610 may allow the donor to select family members and/or friends in a contact list as recipients for data balance transfers.

Recipient eligibility indication region 620 may provide an indication of whether the recipient device and/or the recipient (identified in recipient input region 610) is eligible to receive a data balance transfer. For example, when an input identifying an MDN (or other identifier for the recipient) is received in recipient input region 610, donor user device 120-1 may forward the MDN to third-party data balance transfer system 110 for evaluation. Donor user device 120-1 may forward the MDN to third-party data balance transfer system 110 in real-time (e.g., as the numbers are received via donor UI 600). Third-party data balance transfer system 110 may determine whether the identified recipient user device 120-2 is eligible to receive a data balance transfer, as previously described with respect to block 440 of FIG. 4. For example, third-party data balance transfer system 110 may determine that recipient user device 120-2 is ineligible to receive another data balance transfer if the recipient user device 120-2 has received more than a threshold number of data balance transfers and/or a threshold quantity of data balance transfer during a time period. Donor UI 600 may receive feedback regarding recipient user device 120-2 from third-party data balance transfer system 110 and may graphically indicate whether recipient user device 120-2 is eligible to receive a data balance transfer from donor user device 120-1.

Data balance transfer selection region 630 may identify data balance transfers that recipient user device 120-2 is eligible to receive. For instance, as shown in FIG. 6, the data balance transfers may correspond to a fixed amount of data (e.g., 1 GB) or an amount of data access to perform a function using service network 130 (e.g., viewing multimedia content ("View Movie")) or to access a service (e.g., "5 Hours of Game Access")). In one example, policy rules enforced by third-party data balance transfer system 110 may limit the number of data balance transfers and/or the total amount of data balance transfer that may be given to recipient user device 120-2, and data balance transfer selection region 630 may present data balance transfers options that may selected to be given to recipient user device 120-2 without exceeding the third-party data balance transfer limits.

In one example, third-party data balance transfer system 110 may identify network conditions within service network 130, and may estimate an amount of data to be used to perform certain tasks (e.g., viewing a movie and/or accessing a game). The conditions identified by third-party data balance transfer system 110 may include, for example, an available bandwidth, open ports, available paths, etc. and third-party data balance transfer system 110 estimated the expected amount of data to perform tasks based on the identified conditions. For instance, third-party data balance transfer system 110 may determine a video quality that is supported by service network 130, and third-party data balance transfer system 110 may estimate an amount of data needed by recipient user device 120-2 for viewing the movie in the support video quality. Data balance transfer selection region 630 may then present an option for transferring a data balance to perform a specific task if the estimated amount of data for performing the specific task would comply with the policy limits.

As shown in FIG. 6, donor UI 600 may further include message input region 640 to receive a message from the donor. For example, the inputted message include a greeting, may identify the donor, etc. The message received in message input region 640 may be sent to recipient user device 120-2. For example, the message received in message input region 640 may be included in third-party data balance transfer notification 102.

FIG. 6 shows exemplary portions of donor UI 600 according to some implementations. In other implementations, donor UI 600 may contain fewer portions, additional portions, different portions, or differently arranged portions than those depicted in FIG. 6.

Figure 7:
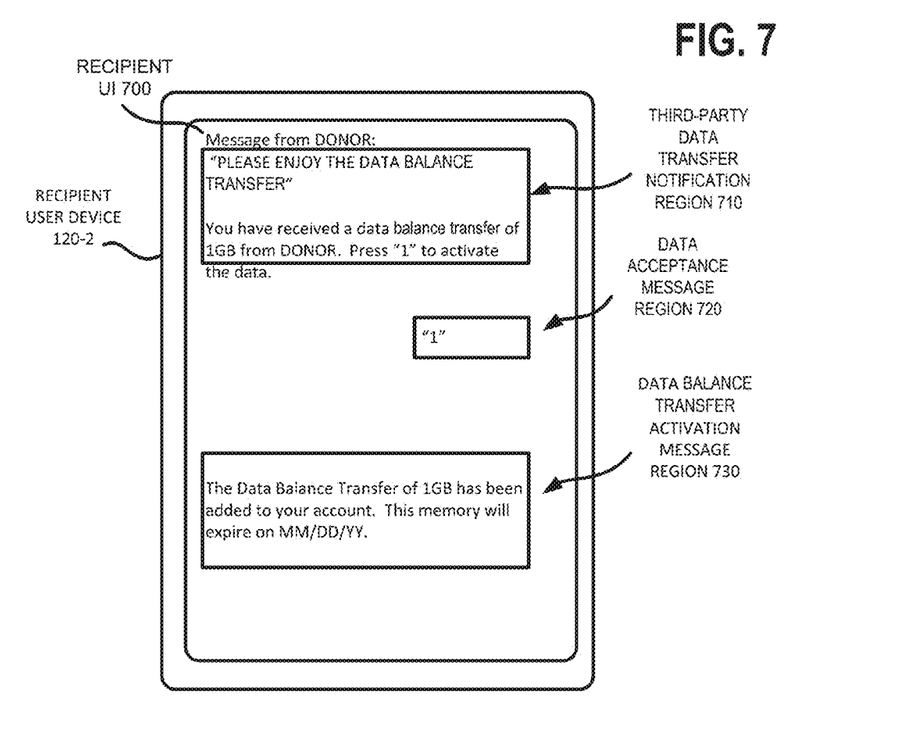
FIG. 7 depicts an exemplary recipient user interface that may be presented by a recipient device in the environment shown in FIG. 2.

FIG. 7 shows a recipient UI 700 that may be presented in connection with receiving an notice about a data balance transfer and activating the data balance transfer in environment 200. As shown in FIG. 7, recipient UI 700 may include a third-party data balance transfer notification region 710, a data acceptance message region 720, and a data balance transfer activation message region 730. As shown in FIG. 7, recipient UI 700 may correspond, for example, an interface to receiving and sending SMS messages related to data balance transfers to recipient user device 120-2.

Third-party data balance transfer notification region 710 may present, for example, a message received via message input region 640. Additionally, third-party data balance transfer notification region 710 may identify the donor and/or an amount of data balance transfer. As shown in FIG. 7, third-party data balance transfer notification region 710 may also include instructions for accessing the transferred memory. Recipient user device 120-2 may store the contents of third-party data balance transfer notification region until the recipient wishes to activate the data balance transfer. For example, recipient user device 120-2 may store the contents of third-party data balance transfer notification region 710 and may clear third-party data balance transfer notification region 710 when the transferred data balance is activated.

Data acceptance message region 720 may receive an input from the recipient to activate the data balance transfer. For example, the recipient may forward a specific activation code (number "1" in the example shown in FIG. 7) to activate the transferred data balance. Data balance transfer activation message region 730 may present an indication that third-party data balance transfer system 110 has received the input presented in data acceptance message region 720 and the transferred data balance is available for access by recipient device 120-2. As further shown n FIG. 7, data balance transfer activation message region 730 may give information about the data balance transfer (e.g., an expiration date). Data balance transfer activation message region 730 may further present instructions for accessing the data balance transfers, such as configuration settings for recipient user device 220-2 to access the data balance transfer.

FIG. 7 shows exemplary portions of recipient UI 700 according to some implementations. In other implementations, recipient UI 700 may contain fewer portions, additional portions, different portions, or differently arranged portions than those depicted in FIG. 7.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 4 and 5, the order of the blocks in processes 400 and 500 may be modified in other implementations. Furthermore, non-dependent blocks may be performed in parallel. Furthermore, processes 400 and 500 may include additional and/or fewer blocks than shown in FIGS. 4 and 5.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
receiving, by a processor of a network device, a request from a first user to initiate a data balance transfer to a second user, wherein the data balance transfer enables usage of an amount of data via a service network;
determining that the first user is eligible to initiate the data balance transfer based on a determination that the first user has initiated fewer than a first threshold number of data balance transfers or transferred less than a first threshold quantity of data during a first time period;
determining, by the processor, whether the second user is eligible to receive the data balance transfer, wherein determining whether the second user is eligible to receive the data balance transfer includes verifying that the second user is a subscriber of the service network;
forwarding, by the processor, a notification to the second user based on determining that the second user is eligible to receive the data balance transfer, wherein the notification identifies an input to be submitted by the second user to accept and activate the data balance transfer;
detecting, by the processor, when the second user submits the input; and
modifying, by the processor responsive to the detecting, account data associated with the second user to activate the data balance transfer.

2. The method of claim 1, wherein forwarding the notification to the second user is further based on determining that the first user is eligible to initiate the data balance transfer.

3. The method of claim 1, wherein determining whether the second user is eligible to receive the data balance transfer further includes:
determining whether the second user has received more than a second threshold number of data balance transfers or a second threshold quantity of data during a second time period; and
determining that the second user is ineligible to receive the data balance transfer based on a determination that the second user has received more than the second threshold number of data balance transfers or the second threshold quantity of data during the second time period.

4. The method of claim 1, wherein the data balance transfer relates to enabling the second user to access the service network to perform a task, and wherein determining whether the second user is eligible to receive the data balance transfer further includes:
identifying a network condition associated with the service network;
calculating, based on the network condition, an amount of data associated with performing the task; and
determining that the second user is eligible to receive the data balance transfer when a sum of the amount of data associated with performing the task and an amount of data associated with another data balance transfer received by the second user is less than a threshold amount of data.

5. The method of claim 1, wherein the data balance transfer is associated with a type of data, and wherein determining whether the second user is eligible to receive the data balance transfer further includes:
identifying a user device associated with the second user;
determining whether the user device is compatible with the type of data; and
determining that the second user is ineligible to receive the data when the user device is not compatible with the type of data.

6. The method of claim 1, wherein the notification includes a first short messaging system (SMS) message comprising an activation code, and wherein detecting when the second user submits the input includes receiving a second SMS message that includes the activation code.

7. The method of claim 1, wherein receiving the request from the first user includes:
providing an interface to receive data identifying the second user;
accessing, based on the received data, the account data associated with the second user;
determining, based on the account data, whether the second user is eligible to receive the data balance transfer; and
providing, via the interface, a graphical indication of whether the second user is eligible to receive the data balance transfer.

8. A network device comprising:
a memory to store instructions; and
a processor to execute one or more of the instructions to:
receive a request from a first user to initiate a data balance transfer to a second user, wherein the data balance transfer enables usage of an amount of data via a service network;
determine that the first user is eligible to initiate the data balance transfer based on a determination that the first user has initiated fewer than a first threshold number of data balance transfers or transferred less than a first threshold quantity of data during a first time period;
determine whether the second user is eligible to receive the data balance transfer, wherein determining whether the second user is eligible to receive the data balance transfer includes verifying that the second user is a subscriber of the service network;
forward a notification to the second user based on determining the second user is eligible to receive the data balance transfer, wherein the notification identifies an input to be submitted by the second user to accept and activate the data balance transfer;
detect when the second user submits the input; and
modify, responsive to the detection, account data associated with the second user to enable the usage of the amount of data associated with the data balance transfer.

9. The network device of claim 8, wherein the notification to the second user is further based on determining that the first user is eligible to initiate the data balance transfer.

10. The network device of claim 8, wherein the instructions further cause the processor, when determining whether the second user is eligible to receive the data balance transfer, to:

determine whether the second user has received more than a second threshold number of data balance transfers or a second threshold quantity of data during a second time period; and
determine that the second user is ineligible to receive the data balance transfer based on a determination that the second user has received more than the second threshold number of data balance transfers or the second threshold quantity of data during the second time period.

11. The network device of claim 8, wherein the data balance transfer relates to enabling the second user to access the service network to perform a task, and wherein the instructions further cause the processor, when determining whether the second user is eligible to receive the data balance transfer, to:
identify a network condition associated with the service network;
calculate, based on the network condition, an amount of data associated with performing the task; and
determine that the second user is ineligible to receive the data balance transfer when a sum of the amount of data associated with performing the task and an amount of data associated with another data balance transfer received by the second user exceeds a threshold amount of data.

12. The network device of claim 8, wherein the data balance transfer is associated with a type of data, and wherein the instructions further cause the processor, when determining whether the second user is eligible to receive the data balance transfer, to:
identify a user device associated with the second user;
determine whether the user device is compatible with the type of data; and
determine that the second user is ineligible to receive the data when the user device is not compatible with the type of data.

13. The network device of claim 8, wherein the notification includes a first short messaging system (SMS) message comprising an activation code, and wherein detecting when the second user submits the input includes receiving a second SMS message that includes the activation code.

14. The network device of claim 8, wherein the instructions further cause the processor, when receiving the request from the first user, to:
provide an interface to receive data identifying the second user;
access, based on the received data, the account data associated with the second user;
determine, based on the account data, whether the second user is eligible to receive the data balance transfer; and
present, via the interface, a graphical indication of whether the second user is eligible to receive the data balance transfer.

15. A non-transitory computer-readable medium to store instructions, the instructions comprising:
one or more instructions that when executed by a processor of a network device, cause the processor to:
receive a request from a first user to initiate a data balance transfer to a second user, wherein the data balance transfer enables usage of an amount of data via a service network;
determine that the first user is eligible to initiate the data balance transfer when the first user has initiated fewer than a first threshold number of data balance transfers or transferred less than a first threshold quantity of data during a first time period;

determine whether the second user is eligible to receive the data balance transfer, wherein determining whether the second user is eligible to receive the data balance transfer includes verifying that the second user is a subscriber of the service network;

forward a notification to the second user based on determining the second user is eligible to receive the data balance transfer, wherein the notification identifies an action input to be performed submitted by the second user to accept and activate the data balance transfer;

detect when the second user submits the input; and modify, responsive to the detection, account data associated with the second user to enable the usage of the amount of data associated with the data balance transfer.

16. The non-transitory computer-readable medium of claim 15, wherein the notification to the second user is further based on determining that the first user is eligible to initiate the data balance transfer.

17. The non-transitory computer-readable medium of claim 15, wherein the one or more instructions further cause the processor, when determining whether the second user is eligible to receive the data balance transfer, to:

determine whether the second user has received more than a second threshold number of data balance transfers or a second threshold quantity of data during a second time period; and determine that the second user is ineligible to receive the data balance transfer based on a determination that the second user has received more than the second threshold number of data balance transfers or the second threshold quantity of data during the second time period.

18. The non-transitory computer-readable medium of claim 15, wherein the data balance transfer relates to enabling the second user to access the service network to perform a task, and wherein the one or more instructions further cause the processor, when determining whether the second user is eligible to receive the data balance transfer, to:

identify a network condition associated with the service network;

calculate, based on the network condition, an amount of data associated with performing the task; and determine that the second user is ineligible to receive the data balance transfer when a sum of the amount of data associated with performing the task and an amount of data associated with another data balance transfer received by the second user exceeds a threshold amount of data.

19. The non-transitory computer-readable medium of claim 15, wherein the one or more instructions further cause the processor, when determining whether the second user is eligible to receive the data balance transfer, to:

identify a user device associated with the second user;

determine whether the user device is compatible with a type of data associated with the data balance transfer; and determine that the second user is ineligible to receive the data when the user device is not compatible with the type of data.

20. The non-transitory computer-readable medium of claim 15, wherein the one or more instructions further cause the processor, when receiving the request from the first user, to:

provide an interface to receive data identifying the second user;

access, based on the received data, the account data associated with the second user;

determine, based on the account data, whether the second user is eligible to receive the data balance transfer; and present, via the interface, a graphical indication of whether the second user is eligible to receive the data balance transfer.

\* \* \* \* \*